US 6,714,756 B2

(12) United States Patent
Iimuro

(10) Patent No.: US 6,714,756 B2
(45) Date of Patent: Mar. 30, 2004

(54) IMAGE READING APPARATUS AND IMAGE PROCESSING APPARATUS

(75) Inventor: Masaaki Iimuro, Kofu (JP)

(73) Assignee: Nisca Corporation, Yamanashi-ken (JP)

( * ) Notice: Subject to any disclaimer, the term of this patent is extended or adjusted under 35 U.S.C. 154(b) by 0 days.

(21) Appl. No.: 09/986,474

(22) Filed: Nov. 8, 2001

(65) Prior Publication Data

US 2002/0054776 A1 May 9, 2002

(30) Foreign Application Priority Data

Nov. 8, 2000 (JP) ........................................ 2000-340218

(51) Int. Cl.⁷ ................................................ G03G 15/00
(52) U.S. Cl. ........................................ 399/361; 399/107
(58) Field of Search ................................ 399/361, 367, 399/107

(56) References Cited

FOREIGN PATENT DOCUMENTS

JP     2000-235338     *  8/2000

OTHER PUBLICATIONS

Patent Abstract of Japan, No. 08133554, publication date May 28, 1996, Applicant Ricoh Co., Ltd.

Patent Abstract of Japan, No. 11194565, publication date Jul. 21, 1999, Applicant Ricoh Co., Ltd.

* cited by examiner

*Primary Examiner*—Quana M Grainger
(74) *Attorney, Agent, or Firm*—Kanesaka and Takeuchi

(57) ABSTRACT

An image reading apparatus is disposed above an image forming apparatus and forms a storage space to store sheets together with the image forming apparatus. The image reading apparatus includes a platen glass, a reading device to read an original placed on the platen glass, a housing having a protruding portion mounted on the image forming apparatus, and an original feeding device to feed the original to the platen and to discharge the same from the platen. This improves the operability of setting the original and taking out the sheet with an image formed thereon, the apparatus more compact in the height direction and lighter in weight, and stability.

16 Claims, 10 Drawing Sheets

US 6,714,756 B2

IMAGE READING APPARATUS AND IMAGE PROCESSING APPARATUS

BACKGROUND OF THE INVENTION AND RELATED ART STATEMENT

The invention relates to an image reading apparatus that optically reads an original surface of a sheet, and to an image processing apparatus mounted with the image reading apparatus to form an image on a sheet based on image data from this image reading apparatus.

Higher image quality, greater multi-functionality and more compactness in the image reading apparatuses, image forming apparatuses and copiers have been made recently along with the sudden development of the electronic technologies and optical technologies.

An image reading apparatus uses CCD, which is an optical conversion means for converting an original image to electrical signals to precisely optically read an original surface and employs high resolution having a large numbers number of pixels. An image forming apparatus equipped with such image reading apparatus not only has a copying function, but also has a printer function to receive print data from data processing apparatuses, such as facsimile function and external personal computer, to print that data. Further, the image forming apparatus has a function to output image data acquired by an image reading apparatus to a data processing apparatus, such as a personal computer. A single unit image forming apparatus is provided with a plurality of functions in an effort to occupy less business space and to improve efficiency.

FIG. 8 shows an external view of an image forming apparatus 210 having such plural functions. Below an image reading apparatus housing 217 and above an image forming apparatus housing 218, a discharge tray 216 is disposed. The image forming apparatus 210 greatly reduces a substantial setup space because the discharge tray 216 for storing sheets formed with images thereon is disposed inside the housing without protruding to the outside of the image forming apparatus 210. Furthermore, the image reading apparatus described above that sets an original on a platen glass 162 which is mounted on the housing 161 as shown in FIG. 9 and that optically reads the original image to an image sensor 172, such as a CCD, by the cooperative operation of a first carriage 163 and a second carriage 167, is known.

To describe this image reading apparatus in further detail, an original placed on the platen glass 162 is illuminated by a light source 164 disposed in the first carriage 163. Light reflected from the original passes an aperture 165 in the first carriage 163 and the light path is deflected in the sub-scanning direction by a first mirror 166. The image on the original whose light path has been deflected is deflected downward by a second mirror 168 on the second carriage 167 and is then deflected in the direction of a lens 171 by a third mirror 169. The image collected in the lens 171 is converted to electrical signals by the CCD 172 mounted to a CCD substrate 173. Then, at the CCD 172, the image converted to electrical signals is processed by an image processing circuit on a control board (not shown in the drawings) disposed in the housing 161.

The structure is formed such that the light path passing via the three mirrors 166, 168 and 169 from the original surface to the lens 171 is always the same length and the first carriage 163 sub-scans at the speed V which is twice greater in speed than that of the second carriage 167.

In this way, because a plurality of cassettes for a variety of sheet sizes is stored in a stacked state in the image forming apparatus, it requires a space to remove the sheets on the discharge tray above the discharge tray, so that the image forming apparatus naturally becomes larger in the height direction. Also, as the image forming apparatus becomes larger in the height direction, the position for forming the image reading apparatus becomes higher to prevent easy handling of the original on the image reading apparatus.

An apparatus to solve such issue is disclosed in Japanese Patent Publication (KOKAI) No. 8-133554 which teaches forming a protrusion on a part of the bottom surface of the image reading apparatus, as shown in FIG. 10, and establishing a storage space for the discharge tray parallel to this protruding portion.

The structure disclosed in Japanese Patent Publication No. 8-133554 uses the protruding portion 301 on the bottom of the image reading apparatus 300 together with the interconnecting portion of the image forming apparatus 305 and by arranging electrical components 302 of the optical system in this protruding portion. Thus, it is possible to decrease the image reading apparatus 300 in the height direction. Furthermore, the entire apparatus including the image reading apparatus is made more compact because the space formed next to this protruding portion 301 is also used as the storage space 303 of the discharge tray 306.

However, in the apparatus disclosed in Japanese Patent Publication No. 8-133554, the protruding portion 301 and the discharge portion 307 are arranged side by side, so that enough storage space can not be formed (removal space). Thus, the removal of the sheet is not easy and there is a problem of not being able to visually confirm the sheet discharged to the discharge tray 306.

Furthermore, an original feeding mechanism 304 to automatically supply the originals stored on the discharge tray 306 to the top of the platen 309, is located above the storage space 303 on the discharge tray 306. A sufficiently strong frame for the entire image reading apparatus is essential to provide stable support for this original feeding mechanism. For that reason, as the image reading apparatus becomes heavier, it becomes, then, essential to increase the strength of the frame of the image forming apparatus to support this image reading apparatus thereby creating the problem of increasing the weight of the entire apparatus system including the image reading apparatus and the image forming apparatus.

Also, the handling of the originals and sheets is inconvenient because the setting direction of the originals supplied by the original feeding mechanism 304 and the direction of removal of the sheets with images thereupon are different.

An object of the present invention is to solve the above problems and to provide an image forming apparatus including an image reading apparatus, which improves the operability of setting an original and taking out a sheet having an image formed thereon, makes the height direction more compact, reduces the weight and has stability.

SUMMARY OF THE INVENTION

An image reading apparatus of the invention is designed to be disposed above an image forming apparatus to form a storage space with an upper surface of the image forming apparatus. The image reading apparatus includes a platen for reading an original; an original feeding mechanism to feed the original to one side of the platen and to discharge the same; reading means disposed under the platen and arranged such that the reading means is moved to read the original immovably placed on the platen and stopped at a predetermined position to read the original passing over the platen with the original feeding means; control means connected to the reading means to control a reading operation of the reading means; and a housing including a first bottom surface to form the storage space, and a second bottom surface protruding from the first bottom surface to be mounted to the image forming apparatus. The second bottom surface of the housing is formed at one side of the platen so that the control means and the original feeding mechanism are disposed above the second bottom surface.

DETAILED DESCRIPTION OF PREFERRED EMBODIMENTS

Figure 1:
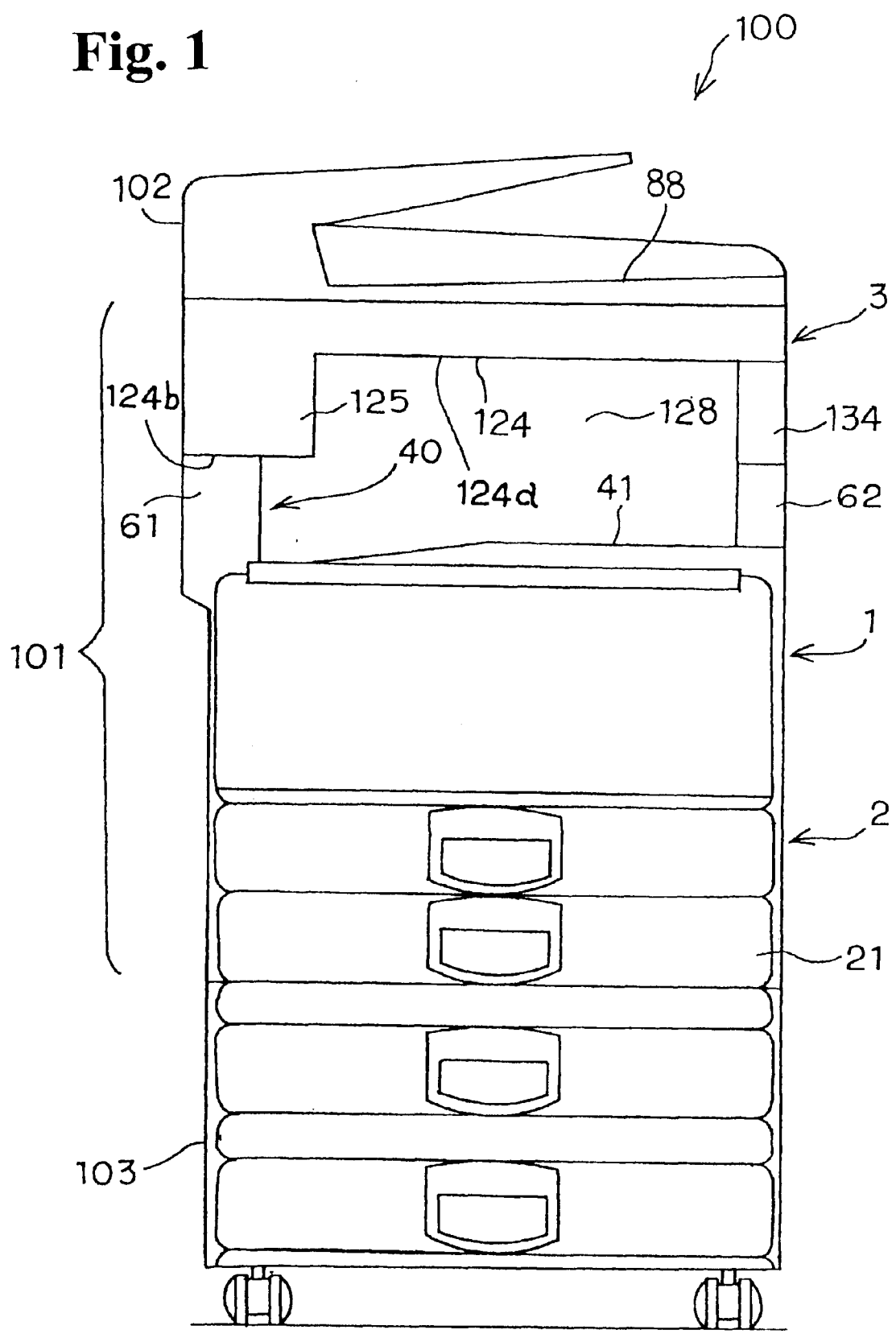
FIG. 1 is a front elevation view of an image processing apparatus including an image reading apparatus and an image forming apparatus according to an embodiment of this invention.

The following describes in detail embodiments of the present invention according to the drawings provided. FIG. 1 is a front view of an image processing apparatus 100 provided with an image reading apparatus 3 and an image forming apparatus according to the embodiment of the present invention.

As shown in FIG. 1, the image processing apparatus 100 is a digital copier having a copying function and a facsimile function combined. It includes an image processing apparatus main body 101 for reading an image on an original and forming the image on a sheet, a sheet supply apparatus 103 mounted below the main body 101 and an automatic document feeder (ADF) 102 mounted above the main body.

The image processing apparatus main body 101 has an image forming apparatus 1, a paper tray 2 and an image reading apparatus (scanner unit) 3 stacked in the vertical direction. The image forming apparatus 1 is disposed in the central area, the paper tray 2 is positioned below the image forming apparatus 1, and the image reading apparatus 3 is arranged above the image forming apparatus 1.

Figure 2:
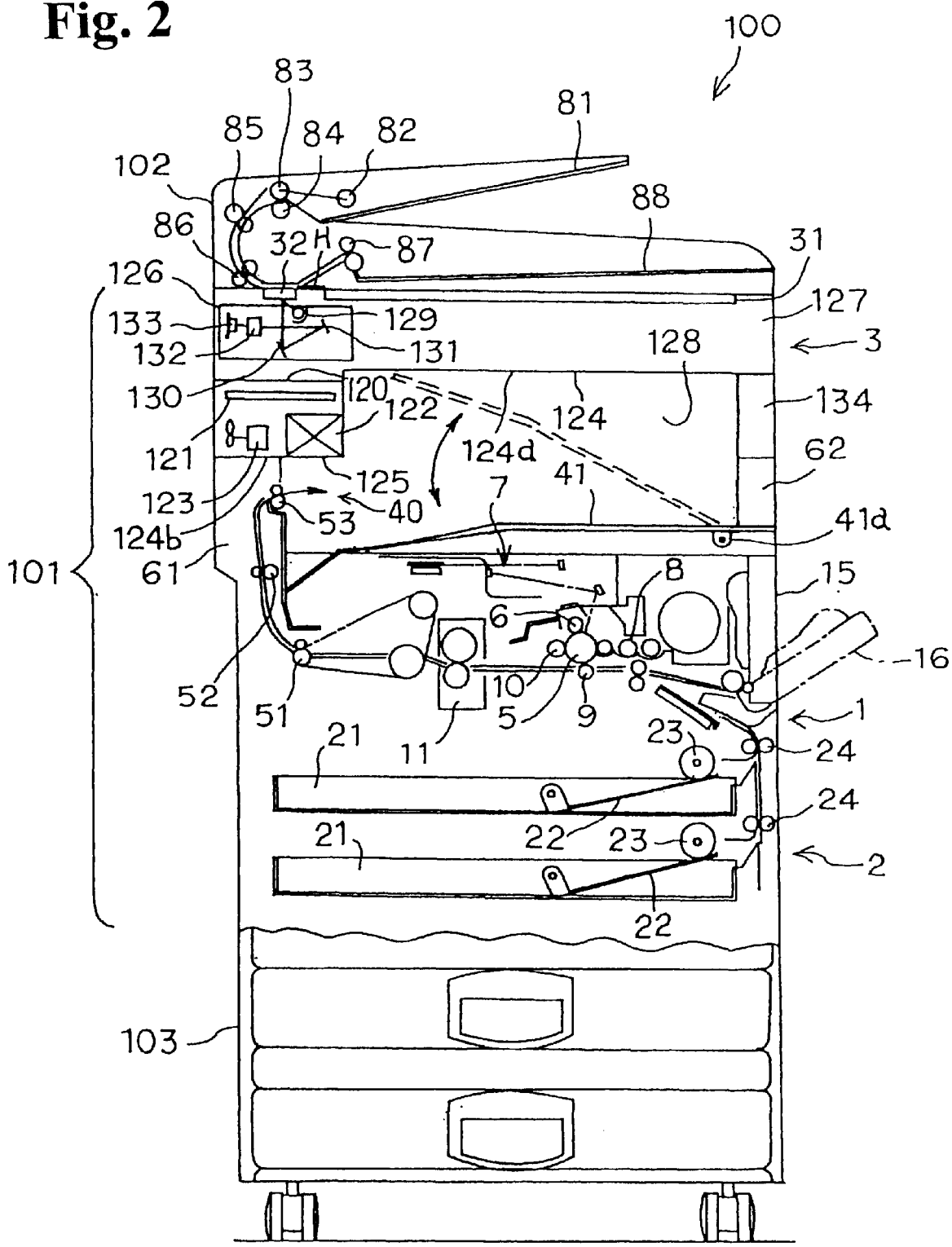
FIG. 2 is a sectional view of the image forming apparatus.

As shown in FIG. 2, the image forming apparatus 1 in the central area has a forming apparatus body housing 15, and a freely opening and closing discharge tray 41 is formed via a hinge 41a on one side. This discharge tray 41 opens and closes one side to enable the easy maintenance and inspection of the inside of the image forming apparatus body housing 15.

On one side of the image forming apparatus 1, there is formed a first support portion 61 which protrudes upwardly from a top side of the image forming apparatus 1 to support the image reading apparatus 3. Also, on the bottom of one edge of the image reading apparatus 3, a protruding portion 125 which protrudes downwardly is formed. A bottom surface (second bottom surface) 124b on the protruding portion 125 and an upper surface of the first support portion 61 on the image forming apparatus 1 are joined, and the image reading apparatus 3 is mounted to the image forming apparatus 1. In other words, the protruding portion 125 functions to mount the image reading apparatus 3 to the image reading unit 1. The image reading apparatus 3 is mainly supported by the first support portion 61 and protruding portion 125.

In addition, on the upper surface of the image forming apparatus 1, there is formed a discharge tray 41, which is described later. By the sheet storage surface on the discharge tray 41, the bottom surface (first bottom surface) 124a on the image reading apparatus 3, the first support portion 61 and the protruding portion 125, the sheet storage space of the discharge tray 41 and a sheet removal space from the discharge tray 41 are formed.

Here, the second support unit 62 is formed to protrude upward on one side of the image forming apparatus 1, and on the other side of the image reading apparatus 3, a leg part 134 is formed to protrude downward. The linking of the second support unit 62 and the leg part 134 provides an auxiliary support for the image reading apparatus 3.

The image forming apparatus 1 will be described according to FIG. 2. A photosensitive drum 5 is disposed in a forming apparatus body housing 15 on the image forming apparatus 1. Around the circumference of the photosensitive drum 5, there are formed electrical chargers 6 to electrically process the surface of the drum, an exposure device 7 to irradiate the drum surface for image information using laser light, a developer device 8 to project the electrostatic latent image onto the drum, a transfer roller 9 to transfer a toner image on the drum to the sheet, a cleaning unit 10 to remove and to recover the toner remaining on the drum, and a fixing device 11 to fix the image to the sheet after transferring the image thereto. These devices including the photosensitive drum 5 form an image forming unit to form an image on a sheet.

A hand-feed tray 16 is rotatably mounted on one side of the forming apparatus body housing 15 on the image forming apparatus 1. Also, cassettes 21 that store the sheets with various sheet sizes are disposed on the paper supply unit 2. The cassette 21 is equipped with a bottom plate 22 resiliently urged in the upward direction, and at the upward portion of the bottom plate 22, there is provided a feed roller 23. Further, the feed roller 24 is disposed near one end of the cassette.

Still further, inside the support unit 61 on the image forming apparatus 1, a feed roller 52 to discharge the sheets having images formed thereon and a discharge unit 40 having a discharge roller 53 are formed. The discharge unit 40 discharges the sheets to a space 128 between the bottom surface of the image reading apparatus 3 and the top surface of the image forming apparatus 1 to store on the discharge tray 41.

Here, to provide a simple explanation of the image forming process of the image forming apparatus 1, a sheet stored in the cassette 21 is fed out from the cassette 21 by the feed roller 23 by lifting the leading edge of the sheet by the bottom plate 22. Then, the sheet fed out is sent to the image forming unit to form the image thereon by the feed roller 24.

At the image forming unit, based on the digital signals read by the image reading apparatus 3 with the image being processed, a laser diode of the exposure device 7 (LD is no shown in the drawings) operates, and after irradiating the laser light from the LD at the polygon mirror, it is irradiated to the photosensitive drum 5 via a mirror to form an electrostatic latent image on the drum. The image is formed on the sheet by passing the sheet along the photosensitive drum 5 having the electrostatic latent image formed thereon. Then, the sheet passes through the fixing device 11 and is fed to the discharge unit 40 via the feed roller 51 and is discharged to the discharge tray by the feed roller 52 and the discharge roller 53 on the discharge unit 40.

Figure 3:
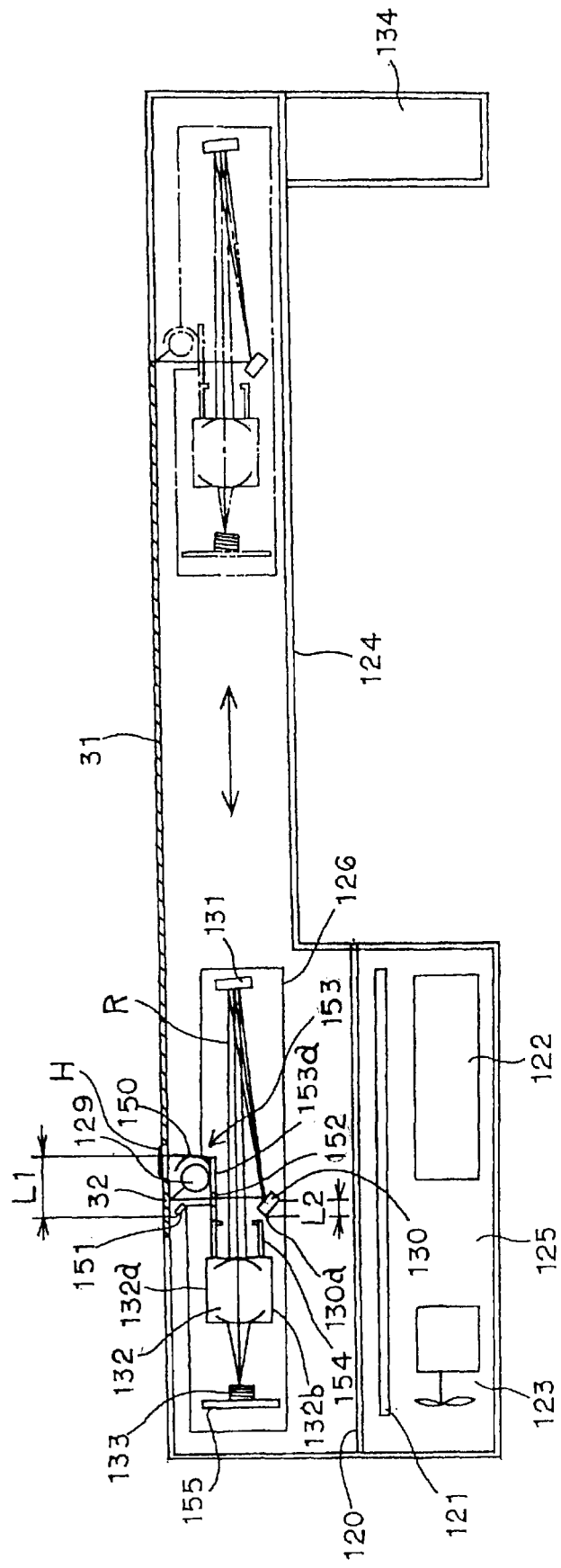
FIG. 3 is a sectional view of the image reading apparatus.
Figure 4:
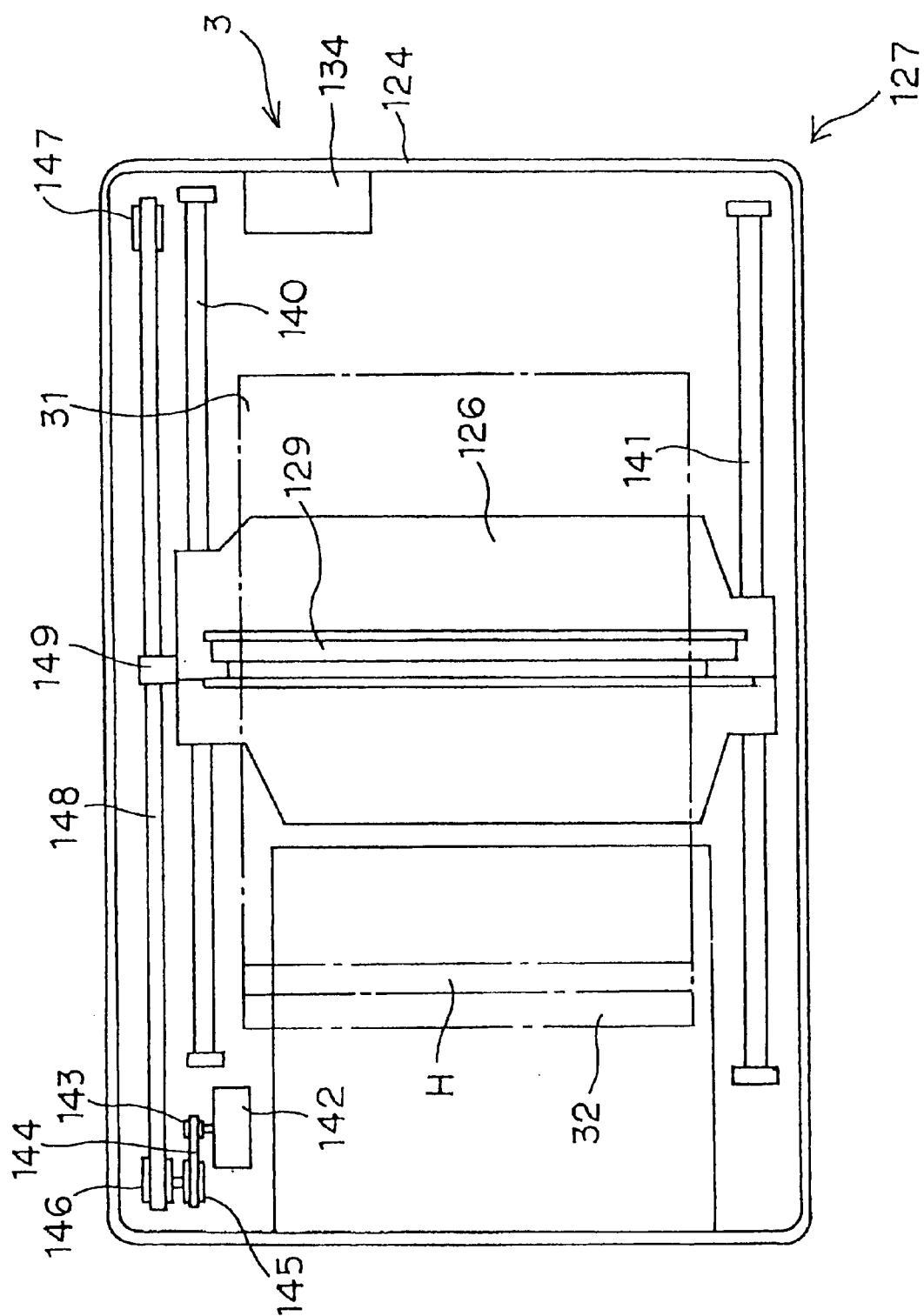
FIG. 4 is a plan view of a platen on the image reading apparatus.

FIG. 4 is a plan view showing the structure below the platen 31 on the image reading apparatus 3, and FIG. 3 is a sectional view of the image reading apparatus 3.

The image reading apparatus 3 is provided with, as shown in FIG. 3 and FIG. 4, a scanner carriage 126, which includes an illuminating unit having a light source 129, a reflective plate 150, a light shield 151 and a reception aperture 152; a mirror 130 to reflect the light from the original illuminated by the light from the light source 129; a mirror 131 to reflect the light reflected from the mirror 130 in the direction along the platen 31; a lens unit 132 having a lens to collect the light reflected from the mirror 131; a shading plate 154 formed in front of the lens unit 132; an image sensor 133 to receive the light from the lens unit 132; and a substrate 155 mounted with the image sensor 133.

Then, a gap between the second mirror 131 and the lens unit 132 is formed to be greater than the lengths L1 and L2 in the optical axis direction of the illuminating unit 153, and the first mirror 130 and the illuminating unit 153 are formed to extend to a range where the effective light is not interrupted between the mirror 131 and lens unit 132. In other words, the illuminating unit 153 is mounted so that its optical axis lowest edge 153a is located lower than the upper surface 132a of the lens unit 132 and above the effective light reception range R of the lens unit 132. The first mirror 130 is mounted with the upper edge 130a higher than the lower surface 132b of the lens unit 132 and lower than the effective light reception range R of the lens unit 132.

The lens unit 132 on the side of the reception aperture 152 in the illuminating unit 153 is provided with a light shield member 151, and an illuminating unit 153 is arranged to come near the lens unit 132. Further, the second mirror 131 is also arranged to come near the lens unit 132. This makes the length of the scanner carriage 126 shorter and the entire image reading apparatus 3 more compact.

The image reading apparatus 3 is provided with a control circuit substrate 121 to control the light of the light source 129 and to process the electrical signals form optical electrical conversion means, a power supply device 122 to supply electric power to each of the drives for reading the images on the original, and a cooling fan 123 to suppress temperature rises caused by heat from the power supply device 122 so that the electrical components, such as the image sensor, are not damaged. The control circuit substrate 121, power supply device 122 and cooling fan 123 are disposed on the protruding portion 125 which protrudes from the bottom surface of the original reading device, and are separated from the scanner carriage 126 by the separating plate 120.

Also, by providing the image reading apparatus 3 with the power supply device 122, it functions not only to form the image on the sheet by linking to the image forming apparatus 1, but also to read the original image independently on the image reading apparatus 3 to be able to send the image data to an external device, such as a personal computer.

As shown in FIG. 3 and FIG. 4, a reading device body housing 124 supports the platens 31 and 32. Inside of the reading device body housing 124, there are provided a guide shaft 140 to slidably support the movable scanner carriage 126, and a guide rail 141 to slidably support the movable scanner carriage on the other side in the main scanning direction.

Also, above the protruding portion 125 inside the reading device body housing 124, there is arranged a drive motor 142 to move the scanner carriage 146, wherein the driving force of the drive motor 142 is transmitted to the scanner carriage 126 via a pulley 143, a timing belt 144, a pulley 145, pulleys 146 and 147, and a timing belt 148. Also, 149 is a linking part of the scanner carriage 126 and timing belt 148.

The home position for the scanner carriage 126 is located on the protruding portion 125 on the image reading apparatus 3. In other words, it is set at the position to read a white reference plate H to offset the shading between the platen glasses 31 and 32 at the discharge unit 40 on the image forming apparatus 1. Also, to read the original placed on the platen glass 31, the carriage 126 reads the image while moving from the home position to the platen glass 31, and when reading by transferring the original with the automatic document feeder 102, the carriage 126 is moved from the home position to the platen glass 32 to read the original that is moving onto the platen glass 32 in the condition that the carriage 126 is stopped at a position below the platen glass 32.

In this image reading apparatus 3, the control circuit substrate 121, the power supply device 122 and the cooling fan 123 are arranged on the protruding portion 125 formed to protrude from the bottom of the image reading apparatus 3, so that the space in the height direction of the image reading apparatus 3 opposing the discharge tray 41 on the image forming apparatus 1 is made more compact and it enlarges the space to take out the sheet on the discharge tray 41.

Also, because the heavy drive motor 42 is arranged on the protruding portion 125 which is also the mounting portion of the image forming apparatus 1 and the image reading apparatus 3, and the power supply device 122 and cooling fan are also arranged on the protruding portion 125, there is no worry concerning instability of the image reading apparatus 3 and is supported in a stable manner on the image forming apparatus 1.

Also, with regard to the home position for the scanner carriage 126, because it is set above the protruding portion 125, the stability of the image reading apparatus 3 is further improved.

The original feeder device or automatic document feeder 102 is disposed on the platens 31 and 32 of the image reading apparatus 3. The automatic document feeder 102 is composed of an original feeding mechanism to feed the originals, an original pressing mechanism to press the originals placed manually on the platen glass 31, an original tray 81 arranged above the platen glass 31, and an original discharge tray 88. The automatic document feeder is arranged to be able to close via a hinge device the platen glasses 31 and 32 with respect to the reading device body housing 124, on the back in reference to the apparatus for operating at the front side.

The original feeding mechanism is composed of a pickup roller 82 to feed the original placed on the original tray 81, a feed roller 83 and a separating roller 84 to separate one original fed from the pickup roller 82, a register roller 85 to orient and feed the original downstream, a feed roller 86 to feed the original toward the top of the platen and a discharge roller 87 to discharge the original that have been read to the original discharge tray 88. The original is guided into a U-shaped feed path from the original tray 81 and is discharged to the original discharge tray 88 in the same direction as the sheet discharge in the image forming apparatus 1.

This original feeding mechanism is disposed over the platen glass 32 arranged at one side of the upper surface of the image reading apparatus 3. In other words, it is arranged on the upper side of the protruding portion 125 of the image reading apparatus 3. In this way, by arranging the heavy original feeding mechanism over the protruding portion 125 which is the mounting portion of the image forming apparatus 1 and the image reading apparatus 3, it is possible for the image reading apparatus 3 to support the original feeding device 102 in a stable manner.

According to the above embodiment, the sheet removal space over the discharge tray 41 is enlarged by mounting the bottom surface 124b of the protruding portion 125 formed below the bottom surface 124a of the image reading apparatus.

Also, because the power supply device and cooling fan 123 are arranged in the protruding portion 125 mounted on the image forming apparatus 1, and the drive motor 132 and original feeding mechanism of the original feeding apparatus 102 are arranged above the protruding portion 125, the strength of the housing for the image forming apparatus 1 and the image reading apparatus 3 is increased and it can support the original feeding device 102 and the image reading apparatus 3 in a stable manner without having a supplemental material disposed to increase strength.

Furthermore, because the original tray 81 and original discharge tray 88 are arranged to overlap above the discharge tray 41, and the sheet discharge direction to the discharge tray 41 and the original discharge direction for the original discharge tray 88 are the same directions, the discharge direction of the sheet formed with the image and the discharge direction of the original that was read are the same. This makes it easier to handle the sheets and originals without the sense of incongruity.

Next, the second embodiment is explained below according to FIG. 5. Structures other than those described below are the same as the first embodiment.

The image reading apparatus 3 according to the second embodiment is provided with a first carriage 201 having a light source 205 to irradiate light through the platen glasses 31 and 32 to a surface of an original and a mirror 206 as the first reflective means to reflect the light from the original; a second carriage 202 moved in association with the first carriage 201 and having mirrors 207 and 208 as the reflective means to reflect the light from the mirror 206; a lens 203 to collect the light reflected from the mirror 208; and a photoelectric conversion means 204 to convert the light received from the lens 203 into electrical signals.

In such a structure, a light path passing via the three mirrors 206, 207 and 208 from the original surface to the lens 203 is always the same by the structure in which the first carriage 201 sub-scans at the speed V twice greater than that of the second carriage 202. In other words, it is possible to move the second carriage 202 in a half movement range relative to the movement range of the first carriage 201. Also, an cutout portion 68 is formed in one portion of the bottom surface 124a of the image reading apparatus 3 to allow the leading edge of the discharge tray 41 to advance inward when opening and closing the discharge tray 41 on the image forming apparatus 1.

In other words, the first and second carriages 201 and 202 are configured to allow the second carriage 202 to move in the range of substantially half of the protruding portion 125 on the image reading apparatus 3, and the lens 203 and light conversion means 204 are arranged in a substantially central position of the image reading apparatus 3, thereby obtaining a space to form the cutout portion 68 inside the housing 124 on the side opposing the protruding portion 145 below the first carriage.

Figure 5:
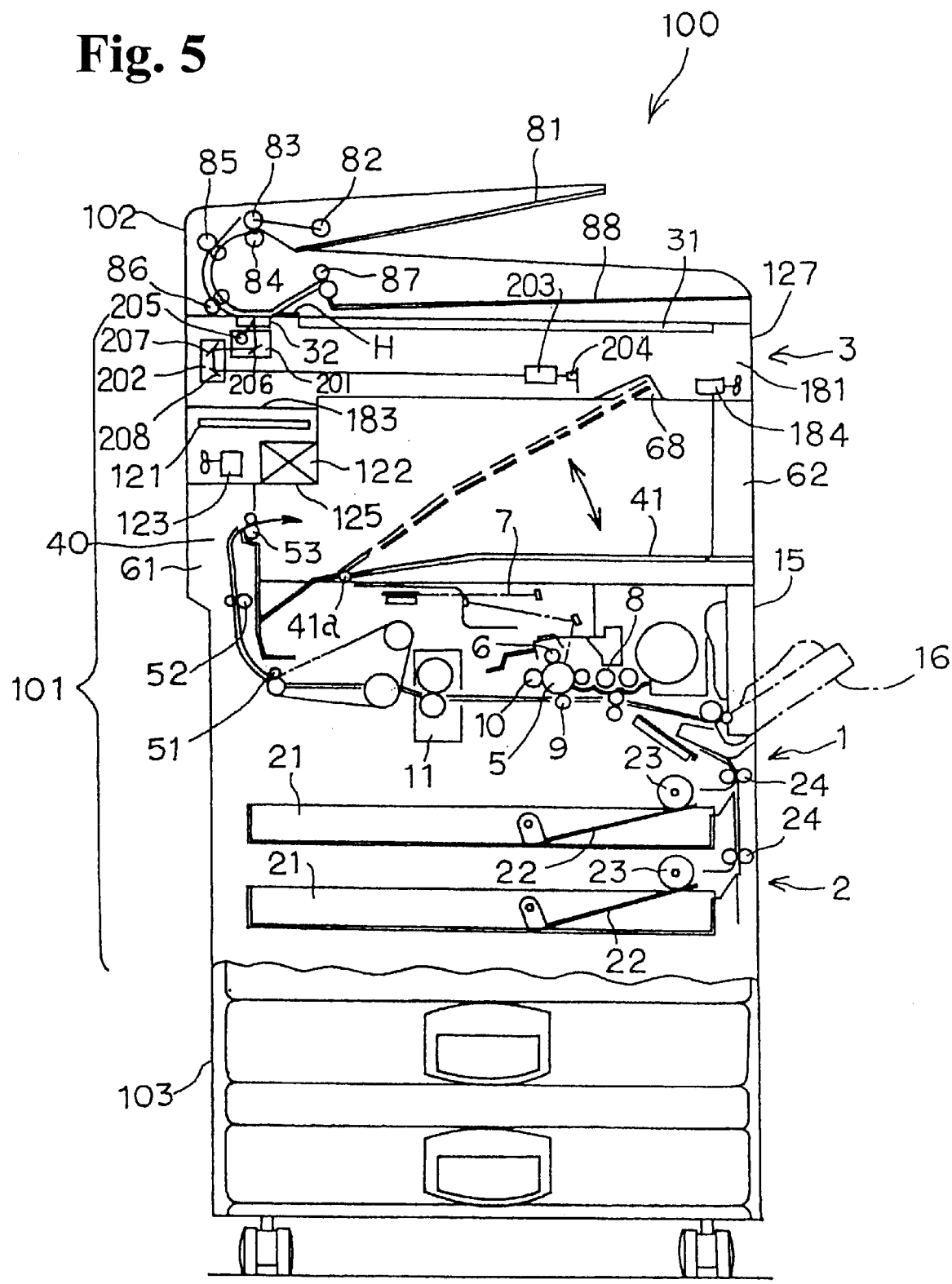
FIG. 5 shows a second embodiment of the present invention.

Forming such a cutout portion 68 and disposing an opening pivot 41a for the discharge tray 41 on the protruding portion 125 side increases the opening angle of the discharge tray 41, as shown in FIG. 5, thereby making the maintenance and inspection easy. Incidentally, numeral 184 is a cooling fan formed above the second support part 62.

Figure 6:
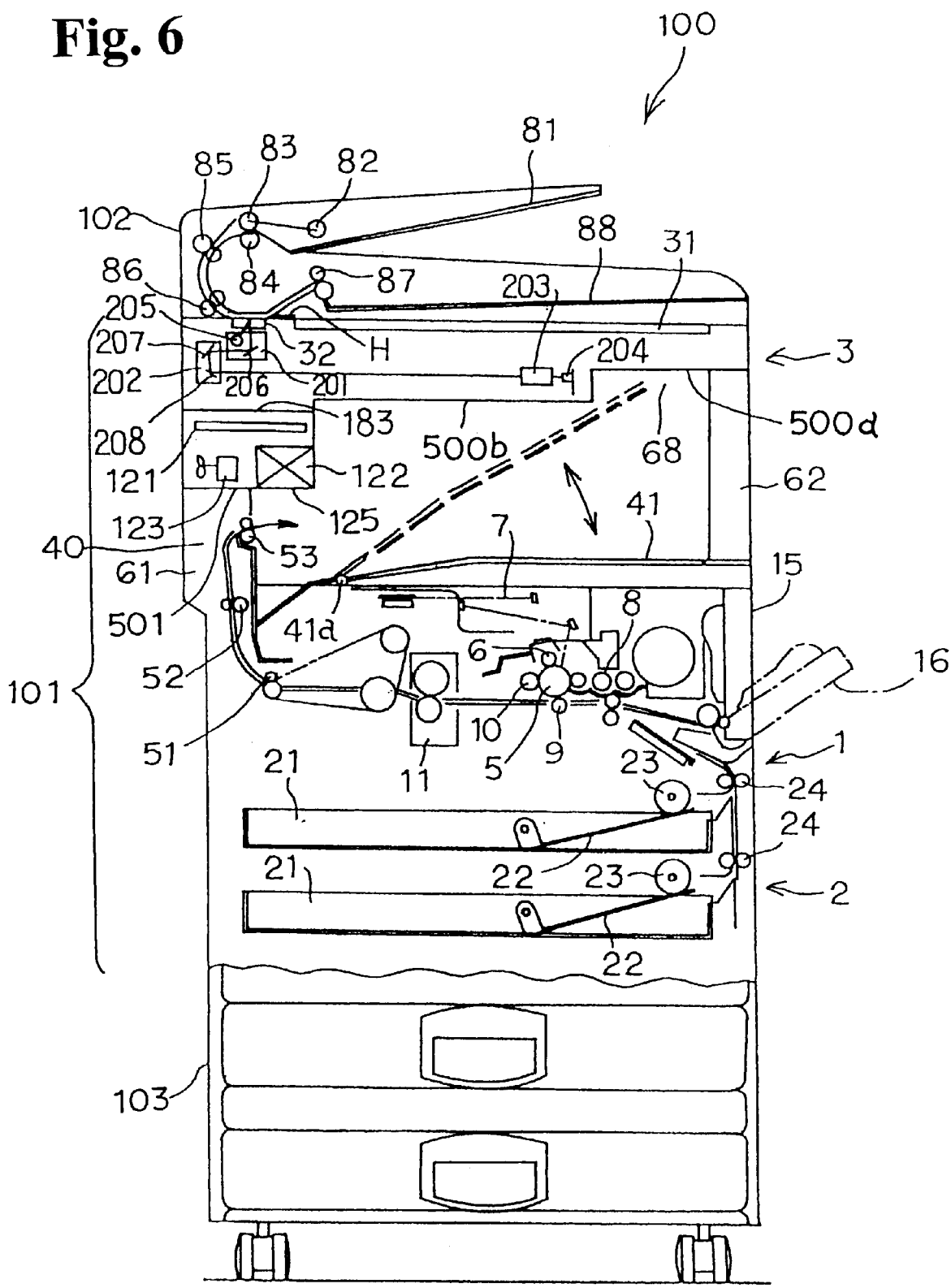
FIG. 6 shows a third embodiment of the present invention.

FIG. 6 shows a third embodiment of the present invention. To describe the third embodiment according to FIG. 6, this third embodiment has an optical reading device comprising first carriage 201 and second carriage 202, a lens 203 and optical conversion means 204, that are the same as the second embodiment described above for the structure of the image reading means for the image reading apparatus 3, and forms a bottom portion opposite to the sheet storage surface of the discharge tray 41 of the image forming apparatus 1 to have a first flat surface 500a and a second flat surface 500b protruding from the first flat surface 500a. This first flat surface 500a is divided to form the movement range of the first carriage 201, and the second flat surface 500b is divided to form a range of the lens 203 and the optical conversion means 204 in addition to the movement range of the second carriage 202.

In other words, the space inside the housing 124 on the side opposite to the protruding portion 125 below the first carriage 201 as described in the second embodiment is eliminated. The entire bottom surface of the image forming apparatus forms a level with the first flat portion 500a, the second flat portion 500b, and a bottom surface 501 of the protruding portion 125 protruding from the second flat portion 500b to abut against the first support portion 61 on the image forming apparatus 1.

This greatly enlarges the original removal space and makes the removal of the sheets simple while improving the visual confirmation of the discharged sheets.

Figure 7:
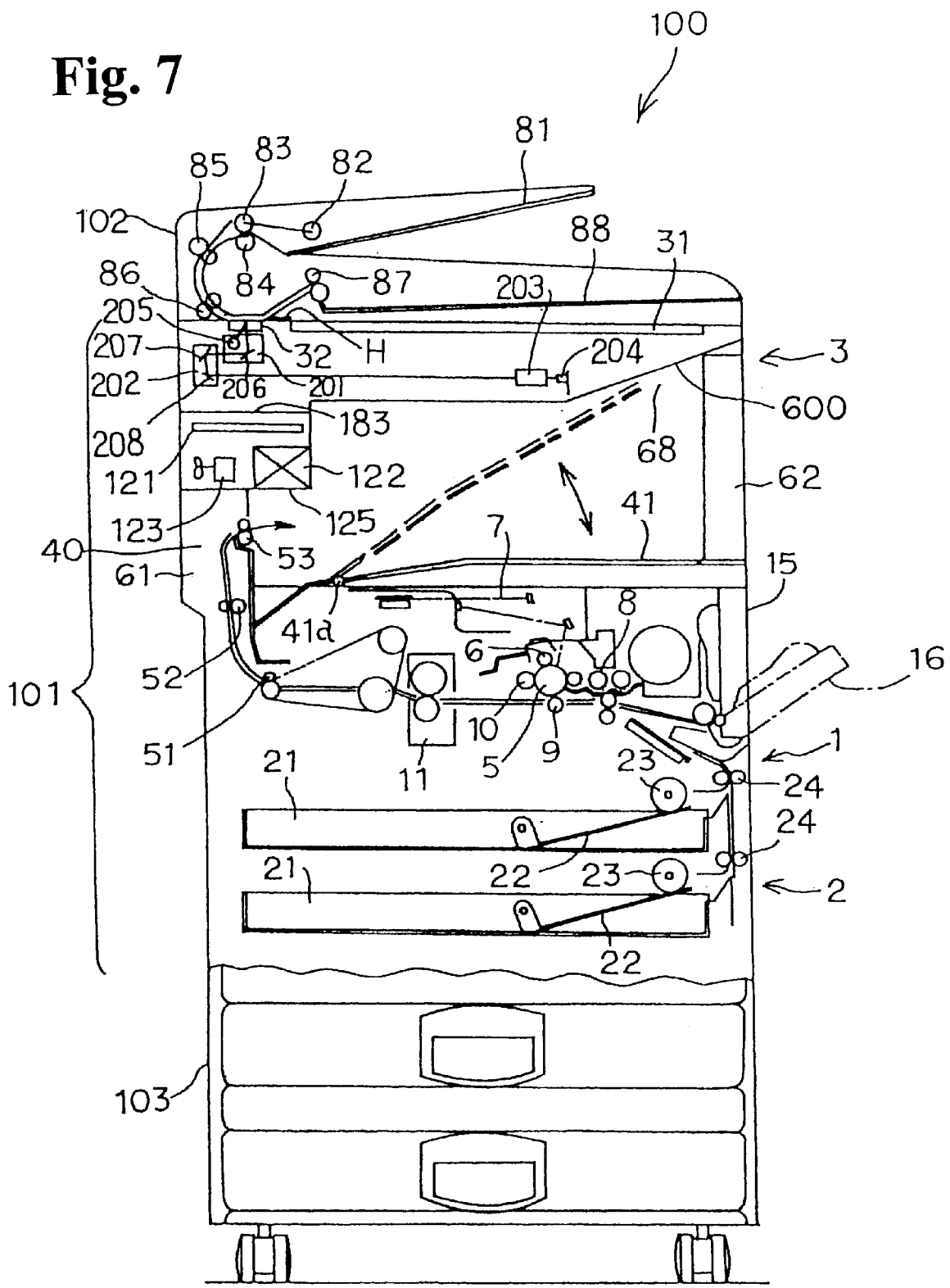
FIG. 7 shows a variation of the third embodiment of the present invention.
Figure 8:
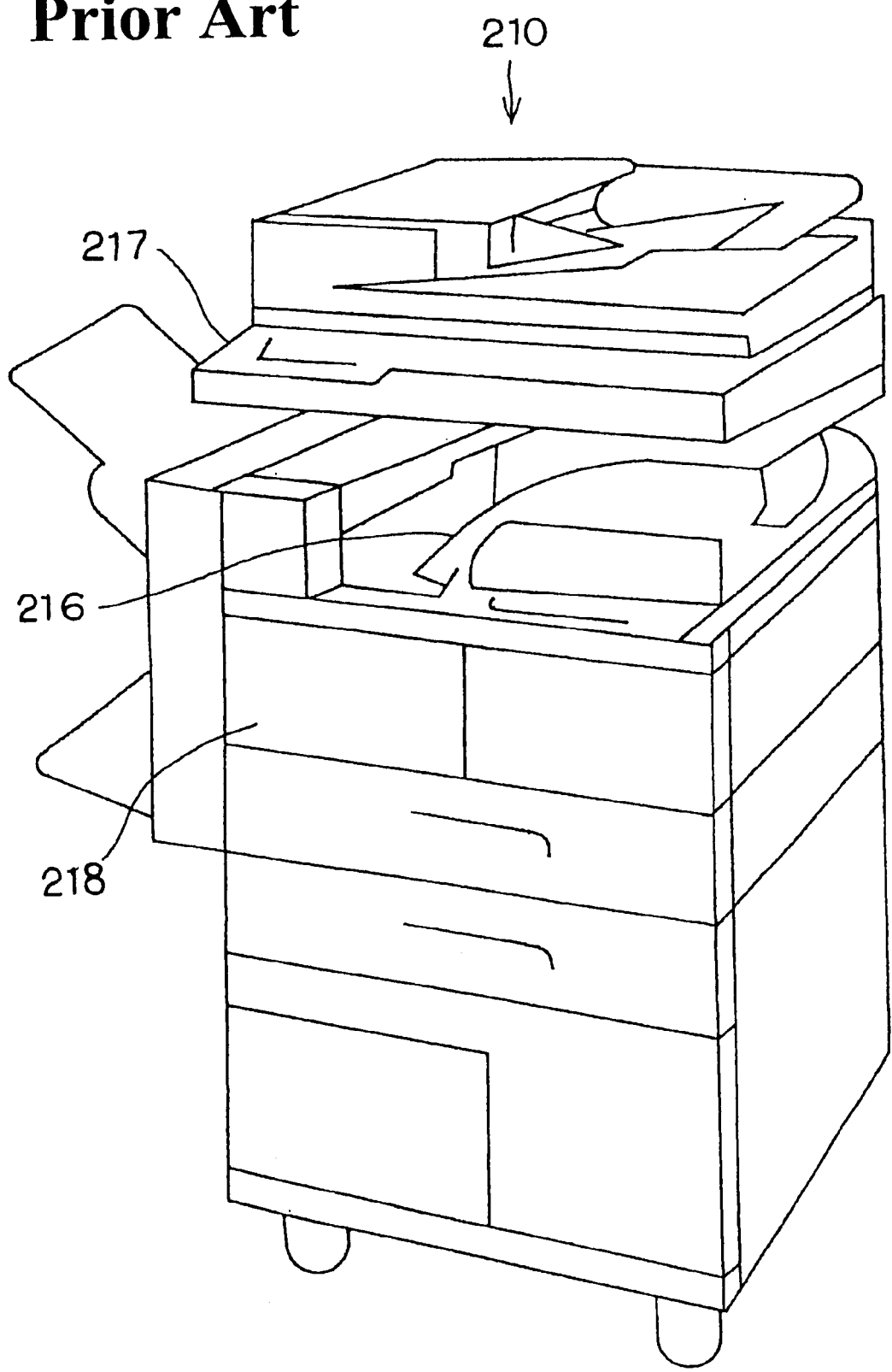
FIG. 8 shows an external view of an image forming apparatus to explain the first prior art.
Figure 9:
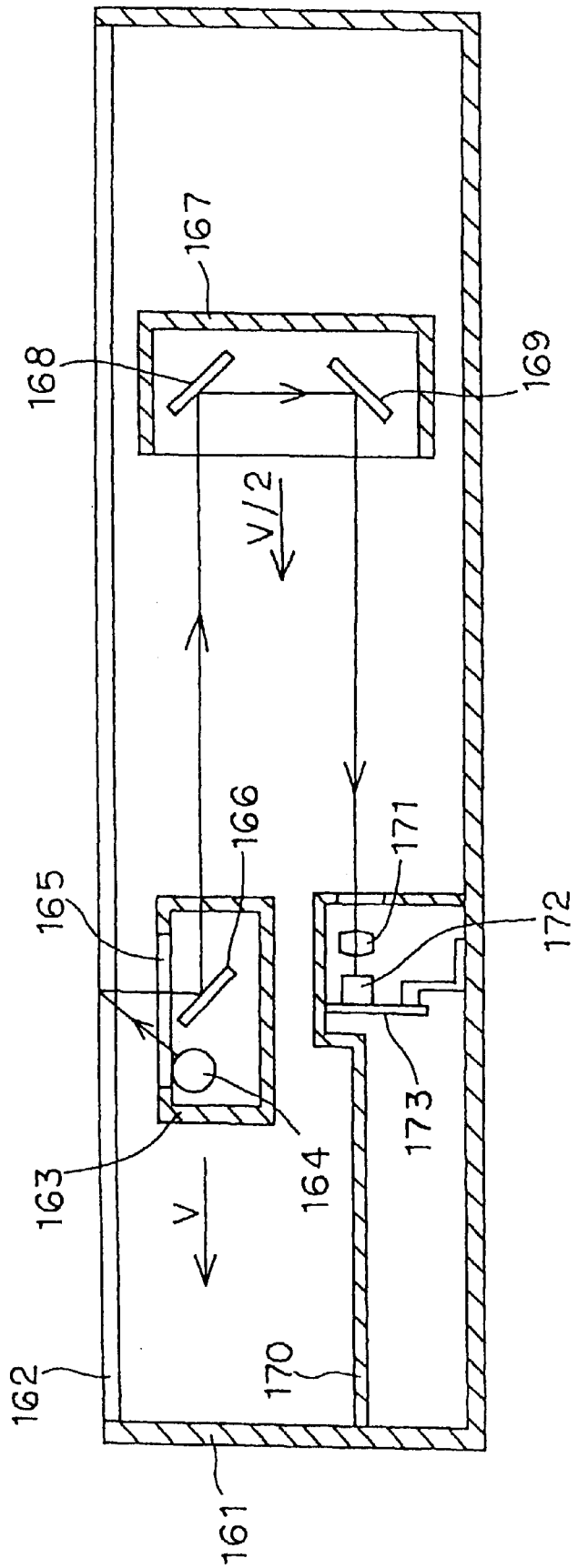
FIG. 9 is a sectional view of an image forming apparatus to explain the first prior art.
Figure 10:
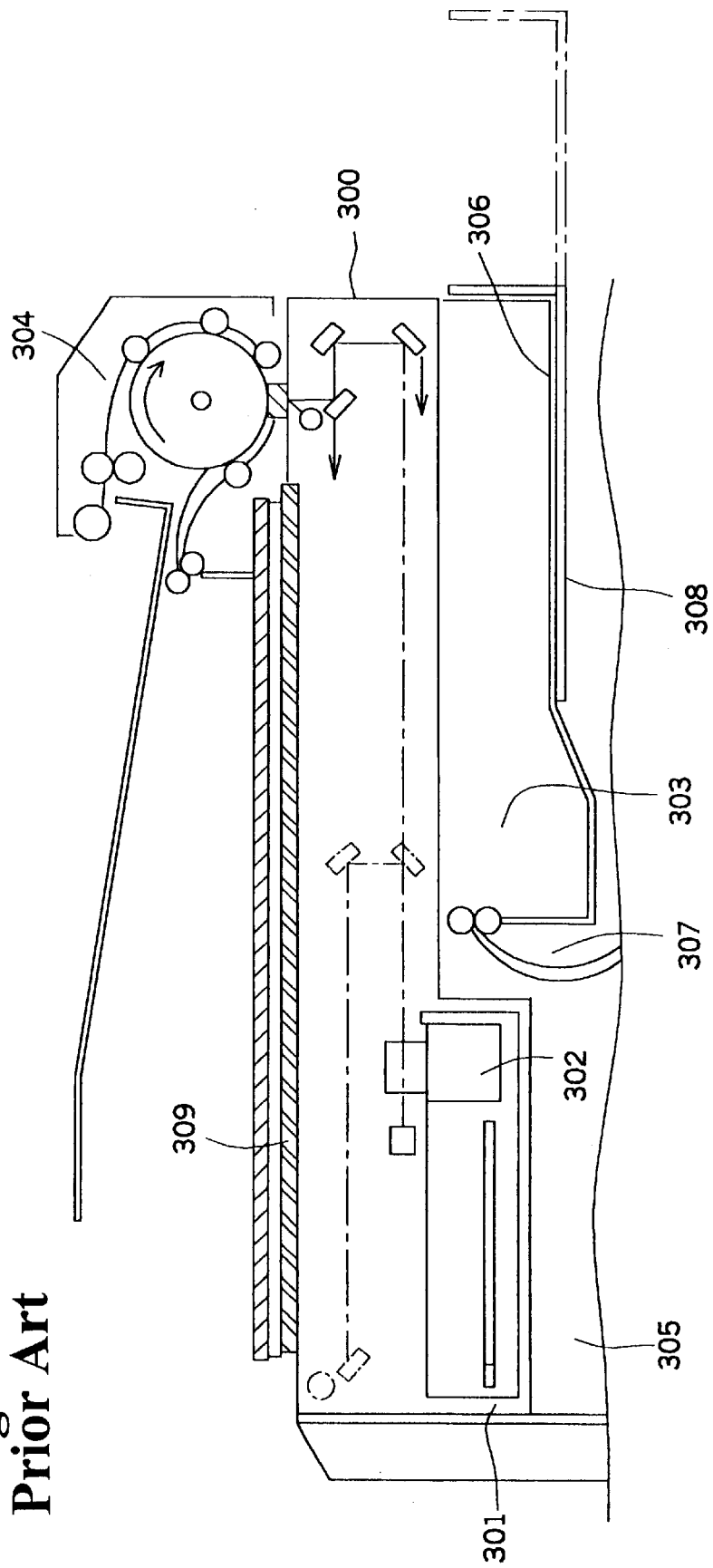
FIG. 10 is a sectional view of an image reading apparatus and an image forming apparatus to explain the second prior art.

Furthermore, FIG. 7 shows a variation of the third embodiment of the present invention. This variation of the embodiment forms an oblique surface 600 that inclines at the bottom surface of the image reading apparatus 3 opposing the sheet discharge direction, opposite to the protruding portion 125. This structure also greatly increases the original removal space.

Furthermore, in the third embodiment and the variation thereof, except for the image reading apparatus 3, the structure of the image forming apparatus 1 and the original feeding means is the same as that of the first embodiment, so an explanation shall be omitted.

While the invention has been explained with reference to the specific embodiments of the invention, the explanation is illustrative and the invention is limited only by the appended claims.

What is claimed is:

1. An image reading apparatus disposed above an image forming apparatus to form a storage space with an upper surface of the image forming apparatus, comprising:

a platen for reading an original;

an original feeding mechanism to feed the original to one side of the platen and to discharge the same;

reading means disposed under the platen, said reading means being moved to read the original immovably placed on the platen and stopped at a predetermined position to read the original passing over the platen with the original feeding means;

control means connected to the reading means to control a reading operation of the reading means; and a housing including a first bottom surface to form said storage space, and a second bottom surface protruding from the first bottom surface to be mounted to the image forming apparatus, said second bottom surface being formed at one side of the platen so that the control means and the original feeding mechanism are disposed above the second bottom surface.

2. An image reading apparatus according to claim 1, further comprising drive means to drive at least one part of the reading means to read the original placed on the platen, said drive means being disposed at one end of the platen above the second bottom surface.

3. An image reading apparatus according to claim 2, further comprising a power supply to drive said drive means, and a cooling fan to lower a temperature inside the housing, said power supply, cooling fan and control means being arranged in a protruding portion having the second bottom surface and protruding from the first bottom surface.

4. An image reading apparatus according to claim 1, wherein said platen includes a first contact glass upon which the original is placed and a second contact glass situated adjacent to the first contact glass where the original is moved by the original feeding means.

5. An image reading apparatus disposed above an image forming apparatus to form a storage space with an upper surface of the image forming apparatus, comprising:

a platen;

reading means for reading an original placed on the platen; and a housing to be mounted on the image forming apparatus and including a first bottom surface formed below one side of the platen to form said storage space, and a second bottom surface formed on the other side of the platen and protruding downwardly from the first bottom surface, said first bottom surface having a flat portion formed at a side close to the second bottom surface, and an oblique portion formed at a side away from the second bottom surface so that a distance between the platen and a portion of the first bottom surface at the side away from the second bottom surface is shorter than a distance between the platen and a portion of the first bottom surface at the side close to the second bottom surface to increase the space with the upper surface of the image forming apparatus at the side away from the second bottom surface.

6. An image reading apparatus according to claim 5, wherein said first reading means includes a first carriage mounted with a light source to illuminate the original, a lens to collect light, a second carriage mounted with a mirror to guide light from the original to the lens, an image sensor to convert the light collected from the lens into electrical signals, and drive means to move the first carriage and the second carriage in a scanning direction of the original.

7. An image processing apparatus comprising:

an image forming apparatus to form an image on a sheet and including a storage tray to store the sheet formed with the image, a support portion disposed to protrude in an upward direction beyond the storage tray, and sheet discharge means for discharging the sheet with the image to the storage tray disposed on the support portion;

an image reading apparatus supported by the support portion for reading an original disposed above the image reading apparatus and including a platen disposed above an upper surface of the image forming apparatus, reading means which is moved to read the original placed on the platen and is stopped at a predetermined position to read the original passing over the platen, a bottom portion formed on one side of the platen to form a storage space for the sheet with the storage tray, and a housing formed on one side of the platen to form a protruding portion protruding downward from the bottom portion and supported on the support portion of the image forming apparatus; and an original feeding apparatus for feeding the original to be read by the image reading apparatus disposed above the image reading apparatus and including an original feeding mechanism disposed on one side of the platen to feed the original on an original supply tray to discharge to an original discharge tray via the platen.

8. An image processing apparatus according to claim 7, wherein said original feeding apparatus includes a discharge path to discharge the original passing over the platen to the original discharge tray fed in a direction as in a sheet discharge direction at the storage tray.

9. An image processing apparatus according to claim 8, wherein said original feeding apparatus is disposed above the storage tray with the original supply tray and the original discharge tray.

10. An image processing apparatus according to claim 7, wherein said image reading apparatus is disposed below one side of the platen and includes drive means to move at least one part of the reading means to read the original placed on the platen.

11. An image processing apparatus according to claim 10, further comprising a power supply to drive the drive means, control means to control the reading means to read the original, and a cooling fan to lower a temperature inside the housing, which are located in the protruding portion of the image reading apparatus.

12. An image processing apparatus according to claim 7, wherein said platen includes a first contact glass on which the original is placed, and a second contact glass situated adjacent to the first contact glass, said original passing over the second contact glass by the original feeding means.

13. An image processing apparatus according to claim 7, wherein said storage tray in the image forming apparatus is formed rotatably to expose an inside of the image forming apparatus, said storage tray having a leading edge forming a cutout portion inserted into the bottom portion of the image reading apparatus.

14. An image processing apparatus according to claim 7, wherein said bottom portion is formed such that a distance between a sheet storage surface on the storage tray and one side of the bottom portion is larger than a distance between the sheet storage surface on the storage tray and the other side of the bottom surface.

15. An image processing apparatus according to claim 7, further comprising auxiliary support means to support the image reading apparatus between an upper surface of the image forming apparatus and a bottom portion of the image reading apparatus.

16. An image reading apparatus disposed above an image forming apparatus to form a storage space with an upper surface of the image forming apparatus, comprising:

a platen;

reading means for reading an original placed on the platen; and a housing to be mounted on the image forming apparatus and including a first bottom surface formed below one side of the platen to form said storage space, and a second bottom surface formed on the other side of the platen and protruding downwardly from the first bottom surface, said first bottom surface having a first flat portion formed at a side away from the second bottom surface and a second flat portion protruding from the first flat portion at a side close to the second bottom surface so that a distance between the platen and a portion of the first bottom surface at a side away from the second bottom surface is shorter than a distance between the platen and a portion of the first bottom surface at a side close to the second bottom surface, said first and second bottom surfaces being arranged from the second bottom surface to the first flat portion through the second flat portion stepwisely to increase the space with respect to the upper surface of the image forming apparatus.

* * * * *